(12) United States Patent
Avril

(10) Patent No.: US 6,979,813 B2
(45) Date of Patent: Dec. 27, 2005

(54) SAFETY-SHUTOFF DEVICE FOR A MANUALLY FED PROCESSING MACHINE

(76) Inventor: John G. Avril, 4445 Kings Run Dr., Cincinnati, OH (US) 45232

( * ) Notice: Subject to any disclaimer, the term of this patent is extended or adjusted under 35 U.S.C. 154(b) by 260 days.

(21) Appl. No.: 10/301,446

(22) Filed: Nov. 21, 2002

(65) Prior Publication Data
US 2003/0117023 A1    Jun. 26, 2003

Related U.S. Application Data

(60) Provisional application No. 60/332,102, filed on Nov. 21, 2001.

(51) Int. Cl.[7] .............................................. G08B 13/18
(52) U.S. Cl. ..................................... 250/221; 340/555
(58) Field of Search ..... 250/221, 222.1; 340/555–557, 340/565, 567, 572.1, 572.4, 679, 539.11, 340/573.1

(56) References Cited

U.S. PATENT DOCUMENTS

| | | | |
|---|---|---|---|
| 3,815,492 A | * | 6/1974 | Simmers ...................... 100/95 |
| 3,970,846 A | * | 7/1976 | Schofield et al. ........... 250/221 |
| 4,075,961 A | | 2/1978 | Harris |
| 4,249,074 A | * | 2/1981 | Zettler et al. ............... 250/221 |
| 4,650,990 A | | 3/1987 | Jonsson |
| 4,818,866 A | | 4/1989 | Weber |
| 5,015,840 A | | 5/1991 | Blau |
| 5,149,921 A | | 9/1992 | Picado |
| 5,164,707 A | * | 11/1992 | Rasmussen et al. ........ 340/551 |
| 5,218,196 A | | 6/1993 | Dogul et al. |
| 5,280,622 A | | 1/1994 | Tino |
| 5,302,942 A | | 4/1994 | Blau |
| 5,315,289 A | * | 5/1994 | Fuller et al. ................ 340/532 |
| 5,563,581 A | * | 10/1996 | Kats ........................... 340/567 |
| 5,880,954 A | | 3/1999 | Thomson et al. |
| 6,160,323 A | | 12/2000 | Mayr et al. |
| 6,243,011 B1 | * | 6/2001 | Rostroem ................... 340/556 |
| 6,411,215 B1 | | 6/2002 | Shnier |
| 6,418,004 B1 | | 7/2002 | Mather et al. |
| 6,470,800 B1 | | 10/2002 | Dunson |
| 6,897,783 B2 | * | 5/2005 | Zeng et al. ................. 340/635 |

* cited by examiner

Primary Examiner—David Porta
Assistant Examiner—Davienne Monbleau
(74) Attorney, Agent, or Firm—Taft, Stettinius & Hollister, LLP

(57) ABSTRACT

An intrusion detection system for altering the operation of an associated machine when an appropriate intrusion is detected, the system comprising: a first detector to detect the presence of a first distinguishing property and to selectively produce an intrusion signal when the first distinguishing property associated with an object is detected within a danger zone approximate a pinch point of a machine, wherein an area approximate the pinch point of the machine does not exhibit the first distinguishing property; and, a controller, operatively coupled to the intrusion detector and the machine, for controlling the operation of the machine, wherein the controller generates a corrective action signal directed toward the machine when intrusion signals are received from the intrusion detector.

27 Claims, 3 Drawing Sheets

SAFETY-SHUTOFF DEVICE FOR A MANUALLY FED PROCESSING MACHINE

REFERENCE TO RELATED APPLICATION

This application claims the benefit of U.S. Provisional Application Ser. No. 60/332,102, entitled "SAFETY-SHUTOFF DEVICE FOR A MANUALLY FED PROCESSING MACHINE", filed on Nov. 21, 2001, the disclosure of which is incorporated herein by reference.

BACKGROUND

1. Field of the Invention

The present invention is directed to detection systems operatively coupled to safety control systems for process machines, and in particular, to detection systems operatively coupled to safety control systems for manually fed process machines having at least one pinch point that can cause serious bodily injury to a worker caught in such a pinch point.

2. Background of the Invention

Process equipment safety systems are well known in the prior art. Most notably, prior art safety systems for industrial machines utilize infrared light curtains or some other sort of light beam safety system. The light curtains are positioned to encircle the machine or, if the machine is rigidly protected on other sides, a light curtain is positioned approximate the area of the unprotected portion of the machine. More often than not, the light curtain is placed in positions where workers have to interact with the machines.

An exemplary infrared curtain safety system comprises a series of infrared transmitters placed opposite a series of infrared detectors and aligned so that during operation of the safety curtain the infrared transmitters transmit infrared light directly to the infrared detectors. Thus, when activated, the transmitters transmit a beam of infrared light that is received by aligned detectors. When an object passes through the curtain, their corresponding detectors are no longer continuously detecting one or more beams of infrared light. This results in the safety system determining that someone or something has entered the work area of the machine. Several safety system responses are taught in the prior art. These responses include signals being sent to the controller of the machine to stop all motion of the machine or reverse the immediate motion of the machine.

An example of such an interaction between a worker and a machine may be shown by way of a worker placing a piece of material in a stretch bender. After the piece is positioned on the stretch bender, the worker removes his body and any other materials hazardous to the operation of the stretch bender and finally activates the light curtain. Generally, a signal from the light curtain that all the detectors are in fact receiving infrared light from the transmitters is required before the stretch bender initiates its process. If the safety curtain for any reason indicates that a corresponding detector is not receiving one or more infrared or other light beams, the safety system considers startup of the stretch bender to be hazardous. Only after the obstructions from the light beams have been removed is the stretch bender authorized to begin its task.

Other prior art safety systems have utilized infrared curtains in addition to other safety devices to provide a safety barrier around process machines. Most notably, prior safety systems have utilized one or more buttons that are depressed by a worker approximate the machine so that the worker and the worker's appendages are outside of the working zone of the machine. If one or more of these buttons fails to be depressed, an interrupt signal or some other corrective signals are sent to machine control unit to cease the movement of the machine and/or immediately reverse the previous movement of the machine. In addition, some prior art systems have utilized ultrasonic detection systems in addition to light curtains such that once the light curtain is pierced an interrupt signal to the machine is not automatic. The ultrasonic detector determines how close in proximity to the machine the object is that pierced the light curtain. If the object is dangerously close to the machine as determined by the ultrasonic detector, then an interrupt signal or other corrective action signal is sent to the machine.

Finally, some additional safety systems have utilized infrared detectors that detect the placement of a human hand. The systems utilize infrared transmitters that transmit infrared light and bounce the infrared light off of the human hand where it is detected by one or more detectors. If the human hand is not completely stagnant for the requisite period of time approximate a safe location as designated by the particular device, the infrared beams of light will not be reflected in sufficient amount or direction to be detected by the infrared detectors. Thus, the safety system determines that the workers appendages may potentially be within the operating zone of the machine. This being the determination, if the machine has not already started up, it will not start up; and, if it has already started its process, it will cease continuation of that process.

SUMMARY

The present invention is related to safety-shutoff devices for manually fed processing machines (such as alligator shears) and to methods for operating processing machines having a pinch point. In addition to alligator shears, such processing machines include, without limitation, other types of shears, slicers, shredders, grinders, and the like. Therefore, for the purpose of this application "pinch point" refers to any area of such processing machine that can cause injury to an operator's hand or appendage, such as areas near shear blades, slicer blades, shredders, rollers, electrical contacts, etc. The present invention is directed to detection systems that detect the presence of a unique property exhibited by a worker or apparel worn by the worker when within a safety zone approximate the pinch point, thereby instructing the safety control system to take corrective action. Also, the present invention is directed to detection systems that detect the presence of a unique property emanating or reflecting from a source and detected by a sensor coupled to a worker's appendage while the worker is within a safety zone approximate the pinch point, thereby instructing the safety control system to take corrective action.

It is a first aspect of the present invention to provide an intrusion detection system for altering the operation of an associated machine when an appropriate intrusion is detected, the system comprising: a first detector to detect the presence of a first distinguishing property and to selectively produce an intrusion signal when the first distinguishing property associated with an object is detected within a danger zone approximate a pinch point of a machine, wherein an area approximate the pinch point of the machine does not exhibit the first distinguishing property; and, a controller, operatively coupled to the intrusion detector and the machine, for controlling the operation of the machine, wherein the controller generates a corrective action signal directed toward the machine when intrusion signals are received from the intrusion detector.

It is a second aspect of the present invention to provide an intrusion detection system for altering the operation of an associated machine when an appropriate intrusion is detected, the system comprising: an alligator shear processing machine having a shear blade for shearing a feed material thereby creating a potential pinch point; a first detector to detect the presence of a first distinguishing property and selectively produce an intrusion signal when the first distinguishing property associated with an object is within a danger zone approximate the pinch point of the alligator shear processing machine, wherein the alligator shear processing machine and a feed material regularly coming into contact with the machine at the pinch point do not exhibit the first distinguishing property; and, a controller, operatively coupled to the intrusion detector to receive intrusion signals and operatively coupled to the processing machine to relay an operational signal for controlling the operation of the processing machine, wherein the controller generates a corrective action signal directed toward the processing machine when intrusion signals are received from the intrusion detector.

It is a third aspect of the present invention to provide a method for safely operating a processing machine having a pinch point, the method comprising the steps of: detecting the presence of at least a first distinguishing property within a danger zone in close proximity to a pinch point of a machine, the first distinguishing property being a property not exhibited by the machine in an area approximate the pinch point; and, transmitting a corrective signal, to a controller operatively coupled to the machine, upon detecting the presence of the first distinguishing property within the safety zone.

It is a fourth aspect of the present invention to provide a method for operating a processing machine having a pinch point that comprises the steps of: sensing the presence of at least a portion of a user's appendage in a zone approximate the pinch point; and, upon sensing the presence of the portion of the user's appendage in the zone, transmitting a shutoff signal to a control of the processing machine.

DETAILED DESCRIPTION

The exemplary embodiments described herein relate to safety-shutoff devices and methods for process machines having a pinch point, for example, without limitation, an alligator shear processing machine. It will, of course, be apparent to those of ordinary skill in the art that the devices and processes disclosed herein may be useful for other types of processing machines having mechanisms that are dangerous to a worker's appendage, such as pinch points, shear blades, slicers, shredders, grinders, rollers, electrical contacts and the like, collectively referred hereinafter as "pinch points". The devices and methods herein described are intended to be used in addition to, or even in place of, existing mechanical guards, restraints, and other devices that are intended to protect the operator from such pinch points. Many applications of the inventions described herein are intended to provide protection to a worker without creating other hazards to the worker, and are intended to prevent the worker from injury due to the worker's lapses and/or absence of safe practices, while not interfering with the proper use of the machinery. Nevertheless, it is to be understood that other objects and advantages of the invention may exist inherently. Therefore, it is not necessary to meet any stated object or advantage of the inventions described herein in order to fall within the scope of the inventions described herein.

Figure 1:
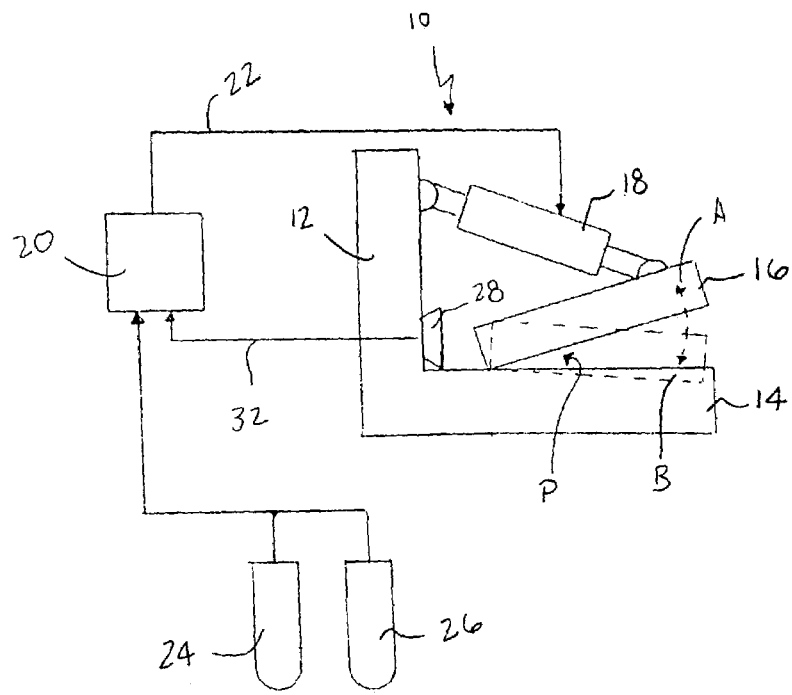
FIG. 1 is a schematic diagram of a first exemplary embodiment of the present invention.

As shown in FIG. 1, an alligator shear machine 10 includes a frame 12 having a stationary shear blade 14 and a moving shear blade 16, which is pivotable between point A and point B. A hydraulic cylinder 18 is coupled between the frame 12 and the shear blade 16, activation of which causes the shear blade to move from point A to point B, thereby causing the cooperating shear blades 14, 16 to shear any object positioned therebetween. Obviously, the pinch point P created by the shear blades 14, 16 is dangerous to a worker's hands.

Operation of the hydraulic cylinder 18 is controlled by a control 20, which transmits control signals 22 to the cylinder 18. Such control signals 22 may include "forward", "reverse", and "stop". Foot pedals 24, 26 operated by the worker are used to send manual commands to the controller 20.

Figure 2:
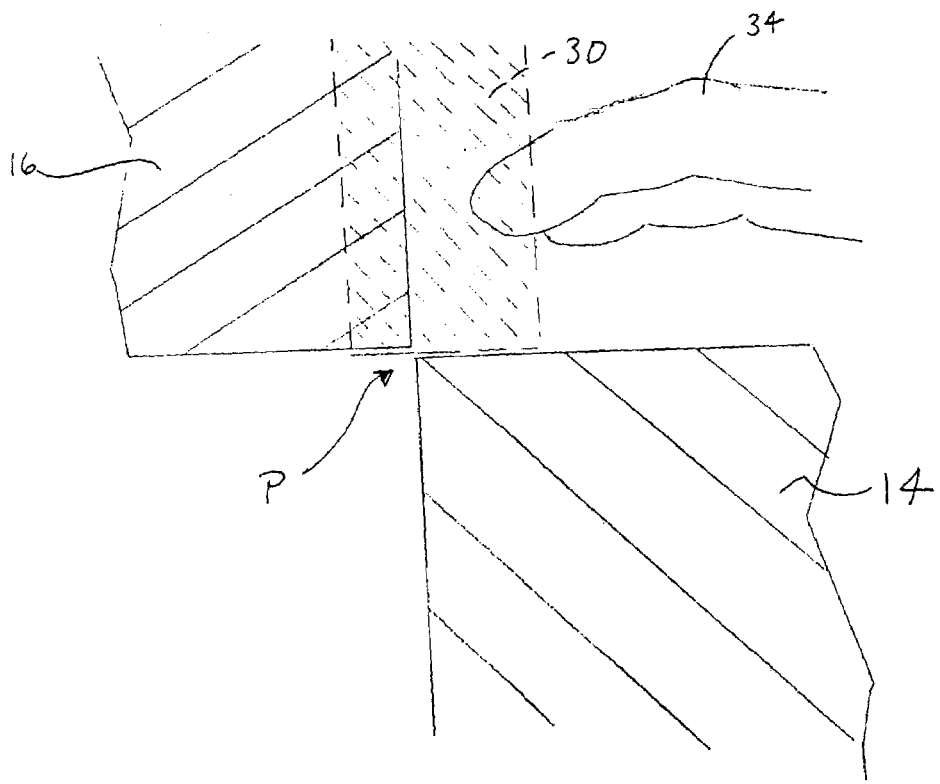
FIG. 2 is a cross-sectional view of a shearing zone of a machine.

As shown in FIGS. 1 and 2, a sensor 28 is provided to detect a property unique from a zone 30 approximate the pinch point P and unique from materials being fed between the blades 14, 16 by the worker. If this unique property is detected in the zone 30 by the sensor 28, the sensor transmits a signal 32 to the controller 20 directing the controller 20 to stop and/or reverse the operation of the hydraulic cylinder 18.

The unique property detected by the sensor 28 in the zone 30 may be a magnetic property, a thermal energy property, an optical property, or an electromagnetic property. Exemplary optical properties include, but are not limited to, visible light and visible light reflected in the presence of a non-visible light source such as, for example, ultraviolet light. Exemplary electromagnetic properties include, but are not limited to, radio waves, microwaves, infrared waves, ultraviolet light waves, and X-rays. In this first exemplary embodiment, the worker will be wearing a glove 34 that exhibits a unique optical property; the glove 34 reflects green light in the visible spectrum. This unique property is detected by an optical sensor 28, which in this exemplary embodiment is a video camera having appropriate light filters to detect only the presence of green visible light. Therefore, when the worker's glove 34 enters the zone 30 the sensor 28 will be operative to transmit the signal 32 to the controller 20, directing the controller to stop and/or reverse advancement of the shear blade 16. Optionally, the sensor 28 may be operative to transmit continuous signals 32 to the controller 20, directing the controller to stop and/or reverse advancement of the shear blade 16 so long as the unique property is within the zone 30. In such an exemplary system, the lapse of signals 32 to the controller 20 would enable normal operation of the shear blade 16 by way of operation of the foot pedals 24, 26. It is also within the scope of the present invention that this unique property may be exhibited by transponders carried in or on the gloves or wristbands worn by the worker so as to emit the unique property.

The sensor 28 may be mounted to the machine 10, such as shown in FIG. 1, for example, or may be mounted remote from the machine. One example of a remote mounting of the sensor 28 involves positioning the sensor above the machine 10 (i.e., suspending it from the ceiling) so that it points downwardly towards the zone 30 approximate the pinch point P. This remote positioning above the machine would reduce any effects of machine vibration on the sensor 28 and may reduce the chance that the worker's hands/gloves 34 may be obscured by the materials being directed toward the pinch point.

It is also within the scope of the invention to provide a visual indication of the zone 30 to the worker. This visual indication of the zone 30 may be provided by a light beam illuminating the zone 30, for example, or by colored tape applied next to the pinch point, for example.

Figure 3:
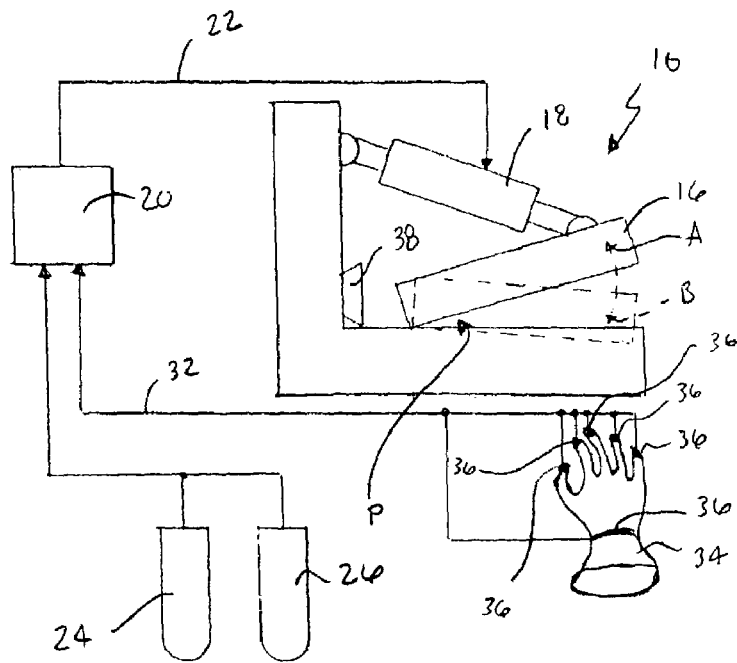
FIG. 3 is a schematic diagram of a second exemplary embodiment of the present invention.
Figure 4:
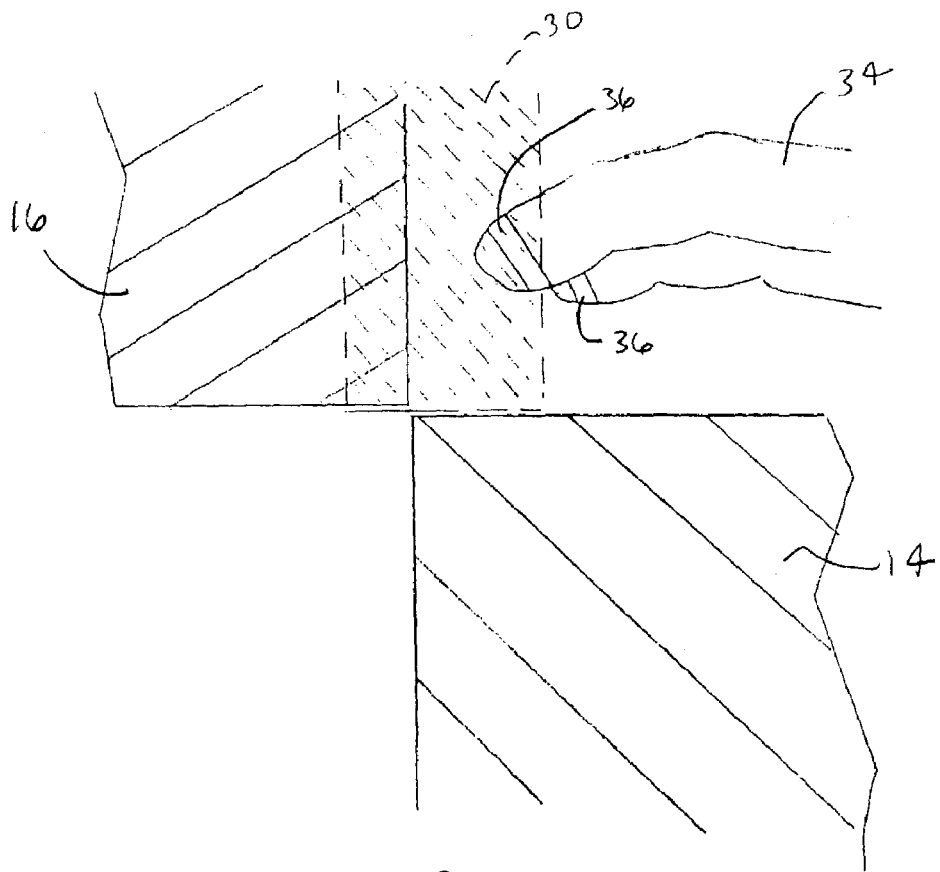
FIG. 4 is a cross-sectional view of a shearing zone of a machine including a user wearing sensors in accordance with the second exemplary embodiment of the present invention.

As shown in FIGS. 3 and 4, in a second exemplary embodiment, sensors 36 are carried on a worker's hand, by way of the worker's glove 34, that are adapted to detect a property unique to the zone 30. For example, a device 38 may be used to create a magnetic field in the zone 30 and the sensors 36 may include inductive coils for sensing this magnetic field created by the device 38 when the sensors 36 enter the zone 30. Alternatively, the device 38 may create an optical property in the zone 30 and the sensors 36 may be optical sensors adapted to sense this visible light created by, or reflecting from, the device 38 in the zone 30. As with the first exemplary embodiment, magnetic properties, thermal energy properties, optical properties, and electromagnetic properties may emanate or reflect from the device 38 such that the sensors 36 are adapted to send a signal 32 to the controller 20, instructing the controller to send an emergency stop command and/or reverse command to the hydraulic cylinder 18 operating the moveable shear blade 16 whenever such a property is detected and/or in a sufficient amount/magnitude. Optionally, the sensors 36 may be operative to transmit continuous signals 32 to the controller 20, directing the controller to stop and/or reverse advancement of the shear blade 16 so long as the unique property is within the zone 30. In such an exemplary embodiment, the lapse of signals 32 to the controller 20 would enable normal operation of the shear blade 16 by way of operation of the foot pedals 24, 26.

Figure 5:
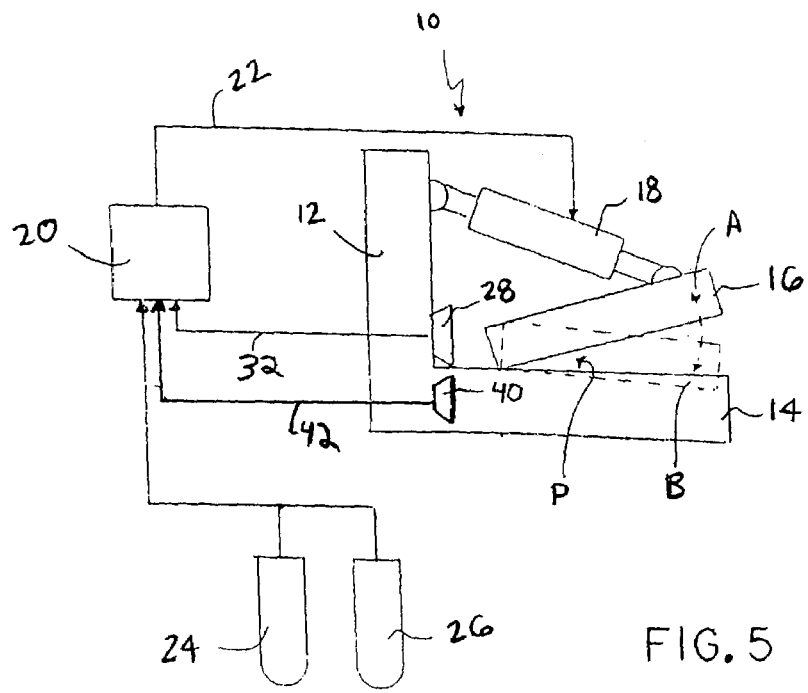
FIG. 5 is a schematic diagram of an alternate first exemplary embodiment of the present invention.
Figure 6:
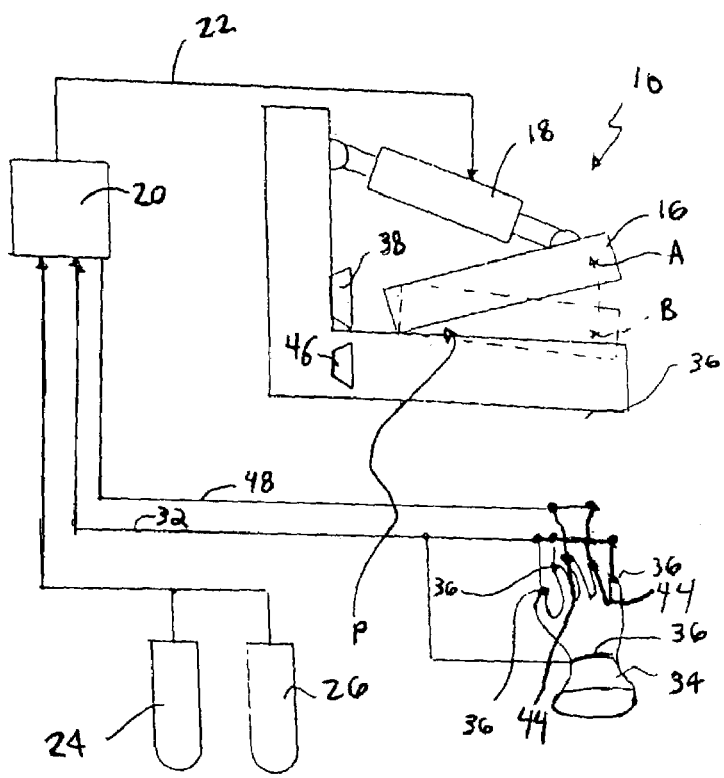
FIG. 6 is a schematic diagram of an alternate second exemplary embodiment of the present invention.

Referencing FIG. 5, it is also within the scope of the invention to have an alternate first exemplary embodiment that provides a second sensor 40 to detect a second distinguishing property unique from the zone 30 approximate the pinch point P and unique from materials being directed toward the blades 14, 16 by the worker. This second sensor 40 may also detect a magnetic property, a thermal energy property, an optical property, or an electromagnetic property. The second detector may be operatively coupled to the controller 20, such that upon detection of a second unique property, a second signal 42 is sent to the controller 20, instructing the controller to send an emergency stop command and/or reverse command to the hydraulic cylinder 18 operating the moveable shear blade 16. It is also within the scope of the present invention that the controller 20 be configured to send an emergency stop command and/or reverse command to the hydraulic cylinder 18 only after the first and second unique properties have been detected within the zone 30 concurrently. It is likewise within the scope and spirit of the present invention to have an alternate second exemplary embodiment that provides a second sensor 44 in the form of a mobile sensor 44 carried on the worker's glove 34 or appendage to detect the second unique property emanating from the second device 46 and transmit a signal 48 to the controller 20 as shown in FIG. 6.

Following from the above description and invention summaries, it should be apparent to those of ordinary skill in the art that, while the methods and apparatuses herein described constitute exemplary embodiments of the present invention, it is to be understood that the inventions contained herein are not limited to these precise embodiments and that changes may be made to them without departing from the scope of the inventions as defined by the claims. Additionally, it is to be understood that the invention is defined by the claims and it not intended that any limitations or elements describing the exemplary embodiments set forth herein are to be incorporated into the meanings of the claims unless such limitations or elements are explicitly listed in the claims. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. An intrusion detection system for altering the operation of an associated machine when an appropriate intrusion is detected, the system comprising:
   a transmitter coupled to an object and adapted to emit a first distinguishing property, wherein the first distinguishing property is at least one of a radio wave, a microwave, an infrared wave, a visible light wave, an ultraviolet light wave, and an X-ray;
   a first intrusion detector to detect the presence of the first distinguishing property and to selectively produce an intrusion signal when the first distinguishing property associated with the object is detected within a danger zone approximate a pinch point of a machine, wherein an area approximate the pinch point of the machine does not exhibit the first distinguishing property; and,
   a controller, operatively coupled to the intrusion detector and the machine, for controlling the operation of the machine, wherein the controller generates a corrective action signal directed toward the machine when intrusion signals are received from the intrusion detector.

2. The intrusion detection system of claim 1, wherein:
   the object is at least one of a human appendage and an article of clothing; and
   a processed material regularly coming into contact with the machine at the pinch point does not exhibit the first distinguishing property.

3. The intrusion detection system of claim 2, wherein:
   the object is at least one of a human appendage and an article of clothing; and
   a feed material regularly coming into contact with the machine at the pinch point does not exhibit the first distinguishing property.

4. The intrusion detection system of claim 1, wherein the first distinguishing property includes a visible light.

5. The intrusion detection system of claim 1, wherein the first distinguishing property includes an infrared light.

6. The intrusion detection system of claim 1, wherein the first distinguishing property includes an ultraviolet light.

7. The intrusion detection system of claim 6, wherein:
   the object is at least one of a human appendage and an article of clothing; and a feed material regularly coming into contact with the machine at the pinch point does not exhibit the distinguishing property.

8. The intrusion detection system of claim 1, wherein the first distinguishing property includes a radio wave.

9. The intrusion detection system of claim 8, wherein:
the object is at least one of a human appendage and an article of clothing; and
a feed material regularly coming into contact with the machine at the pinch point does not exhibit the distinguishing property.

10. The intrusion detection system of claim 1, wherein the first distinguishing property includes a microwave.

11. The intrusion detection system of claim 10, wherein the object is at least one of a human appendage and an article of clothing; and
a feed material regularly coming into contact with the machine at the pinch point does not exhibit the distinguishing property.

12. The intrusion detection system of claim 1, wherein the first distinguishing property includes an X-ray.

13. The intrusion detection system of claim 12, wherein:
the object includes at least one of a human appendage and an article of clothing; and
a feed material regularly coming into contact with the machine at the pinch point does not exhibit the distinguishing property.

14. The intrusion detection system of claim 1, further comprising:
a second transmitter coupled to the object and adapted to emit a second distinguishing property, wherein the second distinguishing property is at least one of a radio wave, a microwave, an infrared wave, a visible light wave, an ultraviolet light wave, and an X-ray;
a second intrusion detector, to detect the presence of the second distinguishing property and selectively produce the intrusion signal when the second distinguishing property associated with the object is within the danger zone approximate the pinch point of the machine, wherein the machine and a feed material regularly coming into contact with the machine at the pinch point do not exhibit the second distinguishing property.

15. The intrusion detection system of claim 14, wherein:
the intrusion signal is continued so long as the first intrusion detector continues to detect the presence of the first distinguishing property within the danger zone;
the intrusion signal is continued so long as the second intrusion detector continues to detect the presence of the second distinguishing property within the danger zone; and,
the corrective action signal is generated so long as the controller receives an intrusion signal from at least one of the first intrusion detector and the second intrusion detector.

16. The intrusion detection system of claim 15, wherein the corrective action signal results in at least one of:
the machine ceasing movement within the danger zone; and,
the machine reversing its most recent movement within the danger zone.

17. The intrusion detection system of claim 1, wherein:
the intrusion signal is continued so long as the first intrusion detector continues to detect the presence of the first distinguishing property within the danger zone; and,
the corrective action signal is generated so long as the controller receives an intrusion signal from the first intrusion detector.

18. The intrusion detection system of claim 17, wherein the corrective action signal results in at least one of:
the machine ceasing movement within the danger zone; and,
the machine reversing its most recent movement within the danger zone.

19. An intrusion detection system for altering the operation of an associated machine when an appropriate intrusion is detected, the system comprising:
a first intrusion detector to detect the presence of a first distinguishing property and to selectively produce an intrusion signal when the first distinguishing property associated with an object is detected within a danger zone approximate a pinch point of a machine, wherein an area approximate the pinch point of the machine does not exhibit the first distinguishing property; and,
a controller, operatively coupled to the intrusion detector and the machine, for controlling the operation of the machine, wherein the controller generates a corrective action signal directed toward the machine when intrusion signals are received from the intrusion detector, wherein:
the first distinguishing property includes an optical property; and
the optical property includes a unique color exhibited by at least a portion of a feed material being fed to the process machine.

20. An intrusion detection system for altering the operation of an associated machine when an appropriate intrusion is detected, the system comprising:
a first intrusion detector to detect the presence of a first distinguishing property and to selectively produce an intrusion signal when the first distinguishing property associated with an object is detected within a danger zone approximate a pinch point of a machine, wherein an area approximate the pinch point of the machine does not exhibit to first distinguishing property; and,
a controller, operatively coupled to the intrusion detector and to machine, for controlling the operation of the machine, wherein the controller generates a corrective action signal directed toward the machine when intrusion signals are received from the intrusion detector; wherein:
the first distinguishing property includes an optical property that is emitted by a transmitter coupled to the object;
the optical property includes a unique color; and
the object includes at least one of a human appendage and an article of clothing.

21. The intrusion detection system of claim 20, wherein the corrective action signal is at least one of a shutoff signal and a reverse operations signal.

22. A method for safely operating a processing machine having a pinch point, the method comprising the steps of:
detecting the presence of at least a first distinguishing property within a danger zone in close proximity to a pinch point of a machine, the first distinguishing property being a property that is emitted by a transmitter coupled to an object and is not exhibited by the machine in an area approximate the pinch point; and
transmitting a corrective signal, to a controller operatively coupled to the machine, upon detecting the presence of the first distinguishing property associated with the object within the danger zone.

23. The method of claim 22, wherein the corrective signal is at least one of a shutoff signal and a reverse signal.

24. The method of claim 22, further comprising the step of detecting the presence of at least a second distinguishing property within the danger zone in close proximity to the pinch point of the machine, the second distinguishing property being a property that is emitted by a transmitter coupled to the object and is not exhibited by the machine in an area approximate the pinch point.

25. The method of claim 22, further comprising the step of exhibiting, by at least a portion of the user's band, or by at least a portion of the user's glove worn on the user's hand, the first distinguishing property.

26. The method of claim 22, wherein the first distinguishing property is a property not exhibited by materials regularly processed at the pinch point.

27. A method for operating a processing machine having a pinch point that comprises the steps of:

sensing the presence of at least a portion of a user's appendage in a zone approximate the pinch point; and upon sensing the presence of the portion of the user's appendage in the zone, transmitting a shutoff signal to a control of the processing machine; wherein the sensing step includes sensing a portion of the user's appendage by detecting an optical property associated with the user's appendage or apparel covering the appendage that is unique with respect to the pinch point, wherein the sensing step includes sensing a portion of the user's appendage by detecting an electromagnetic property associated with the user's appendage or apparel covering the appendage, and emitted from a transmitter coupled thereto, that is unique with respect to the pinch point.

* * * * *